US009362620B1

(12) United States Patent
Kuo et al.

(10) Patent No.: US 9,362,620 B1
(45) Date of Patent: Jun. 7, 2016

(54) DYNAMICALLY RECONFIGURING ANTENNA BANDWIDTH BASED ON USER SCENARIO

(71) Applicant: Amazon Technologies, Inc., Reno, NV (US)

(72) Inventors: Jerry Weiming Kuo, Cupertino, CA (US); Isaac Scott Noble, Soquel, CA (US)

(73) Assignee: Amazon Technologies, Inc., Reno, NV (US)

(*) Notice: Subject to any disclaimer, the term of this patent is extended or adjusted under 35 U.S.C. 154(b) by 454 days.

(21) Appl. No.: 13/898,329

(22) Filed: May 20, 2013

(51) Int. Cl.
*G01S 19/48* (2010.01)
*H01Q 3/26* (2006.01)

(52) U.S. Cl.
CPC .................................. *H01Q 3/2605* (2013.01)

(58) Field of Classification Search
CPC ....................................................... G01S 19/48
USPC .............................. 342/357.31; 455/77, 3.06
See application file for complete search history.

(56) References Cited

U.S. PATENT DOCUMENTS

2006/0226735 A1* 10/2006 Ikehashi .................. H01G 5/18 310/311
2009/0073066 A1* 3/2009 Jordon ................... H01Q 13/10 343/770
2010/0041348 A1* 2/2010 Wilcox ................ H04B 1/0458 455/77
2010/0112936 A1* 5/2010 Friman .................... H01Q 7/00 455/3.06
2012/0220243 A1* 8/2012 Mendolia ............. H04B 1/0458 455/77
2013/0015243 A1* 1/2013 Garber .................... D06F 73/02 235/385

FOREIGN PATENT DOCUMENTS

WO WO 2012143936 A1 * 10/2012 ............. H01Q 1/242

* cited by examiner

*Primary Examiner* — Harry Liu

(74) *Attorney, Agent, or Firm* — Seyfarth Shaw LLP; Ilan N. Barzilay

(57) ABSTRACT

Various embodiments provide a dynamic antenna system that adapts, by adjusting various antenna circuit parameters, to accommodate a particular circumstance or set of conditions being imposed on the computing device at a given time. For example, signal strength of the antenna system can be monitored and, upon detecting a change in the signal strength, a condition associated with the change, such as the user holding the device with two hands, can be identified based on offline testing, measurement, and pattern recognition. Accordingly, the one or more parameters of the antenna system, which can include multiple antennas and other reconfigurable components, can be adjusted to optimize the antenna efficiency for the particular condition associated with the change in signal strength.

23 Claims, 5 Drawing Sheets

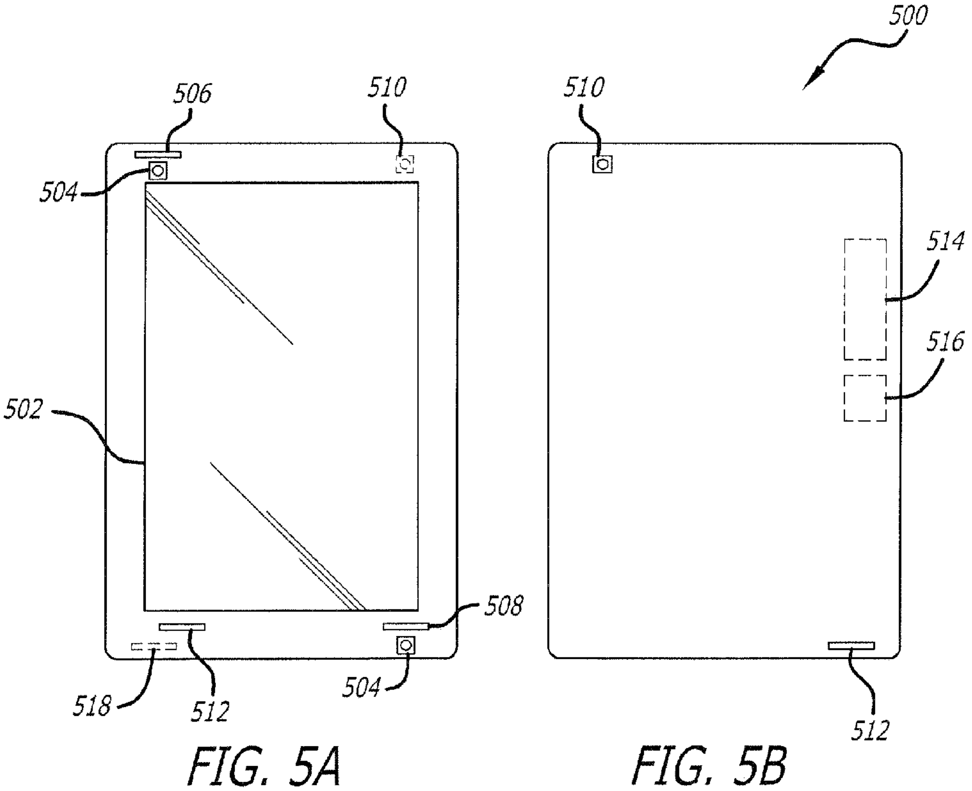
FIG. 5A
FIG. 5B
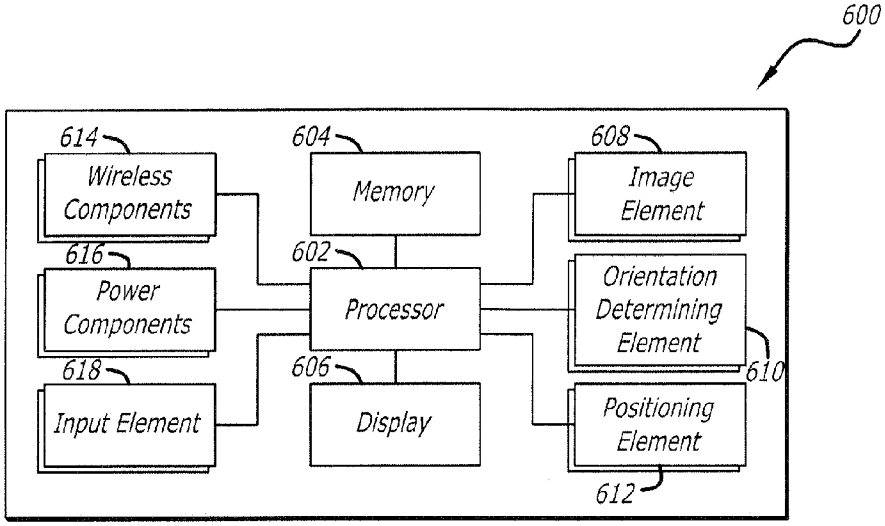
FIG. 6

DYNAMICALLY RECONFIGURING ANTENNA BANDWIDTH BASED ON USER SCENARIO

BACKGROUND

Users are increasingly using various electronic and computing devices to not just store, track, and update various types of information and handle various types of tasks that require various sensors and components, but also to play games and engage other kinds of entertainment through a relatively large high quality display. As a result, computing devices are being ever packed with components and sensors to enable and drive all of these applications and features. For example, it is now common for a display to take up most, if not almost all, of a computing device's front face, thereby leaving little room for all of these components and sensors, which are becoming standard on many devices. Accordingly, there is limited space for components, such as the antenna, and the space available is often tightly squeezed between other components. As a result of being squeezed between many other metal components, the effective radiation bandwidth of these antennas is becoming narrower. Since almost every country uses a different part of the communications spectrum, these increasing bandwidth constraints are becoming increasingly problematic as computing device manufacturers try to accommodate a wider range of bands to meet the communication specifications for each country (e.g., WAN: Band 17, 5, 8, 4, 2, 1, 7; WCS bands; Dual Band WiFi: 2.4G/5G; MIMO). Therefore, as computing devices, and other wireless communication devices, become smaller and embedded with ever more components for enabling various functions and applications, it can be advantageous to adapt the way in which antennas are configured and/or receive signals to meet increasing communication specifications while combatting increased constraints being imposed on the same.

BRIEF DESCRIPTION OF THE DRAWINGS

Various embodiments in accordance with the present disclosure will be described with reference to the drawings, in which:

FIGS. 5A and 5B show an example computing device that can be used to implement aspects of various embodiments;

FIG. 6 shows example components that can be used with a device such as that illustrated in FIGS. 5A and 5B.

DETAILED DESCRIPTION

Systems and methods in accordance with various embodiments of the present disclosure may overcome one or more of the aforementioned and other deficiencies experienced in conventional approaches to optimizing antenna efficiency of a computing device. In particular, various approaches provide a dynamic antenna system that adapts, by adjusting various antenna circuit parameters, to accommodate a particular circumstance or set of conditions being imposed on the computing device at a given time. For example, signal strength of the antenna system can be monitored and, upon detecting a change in the signal strength, a condition associated with the change, such as the user holding the device with two hands, can be identified based on offline testing, measurement, and pattern recognition. Accordingly, the one or more parameters of the antenna system, which can include multiple antennas and other reconfigurable components, can be adjusted to optimize the antenna efficiency for the particular condition associated with the change in signal strength.

Further, one or more sensors of the computing device can be used to determine various user circumstances, such as how the user is holding the device, if the device is pressed tightly against the user's head, and the like, and the antenna system can be adjusted based thereon. Accordingly, the one or more sensors, such as a proximity sensor, a grip sensor, a camera, and the like, can be used to determine these various user circumstances in anticipation of a drop in signal strength associated therewith and to initiate an appropriate antenna system configuration.

Various other functions and advantages are described and suggested below as may be provided in accordance with the various embodiments.

Figure 1A:
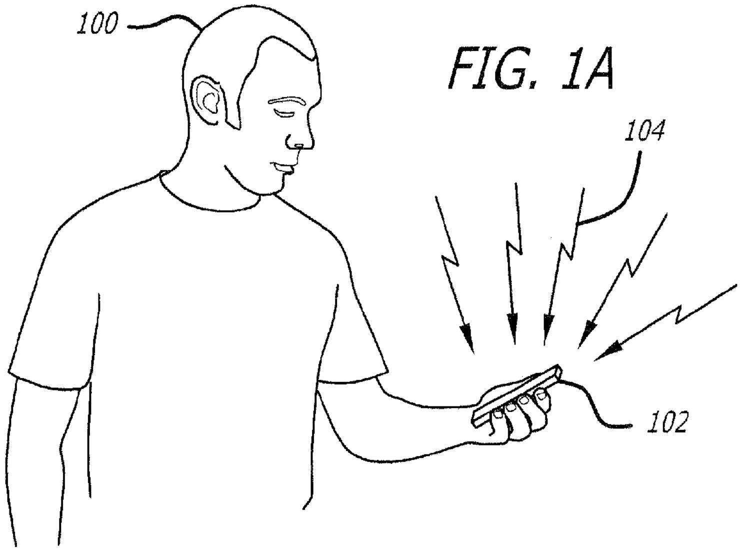
FIGS. 1A, 1B, and 1C show three example situations in which a computing device may experience varying levels of antenna efficiency in accordance with at least one embodiment.
Figure 1B:
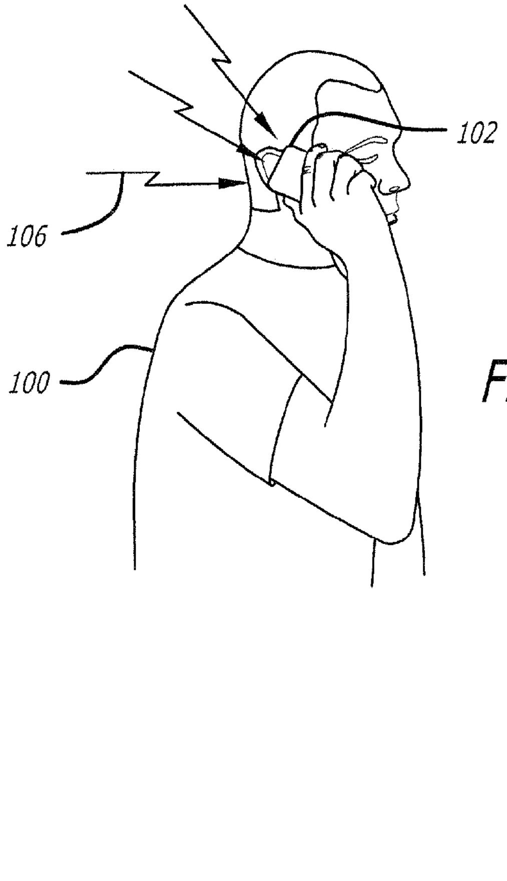
Figure 1C:
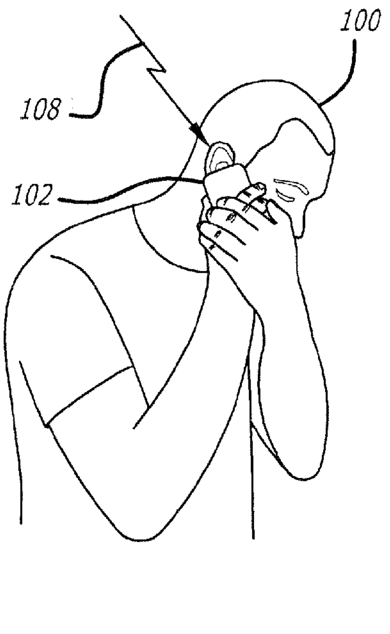

FIGS. 1A-1C show example situations of a computing device being subject to different user circumstances in accordance with various embodiments. FIG. 1A shows user 100 holding computing device 102 in a speaker phone mode. Although a smart phone is shown, it should be understood that various other types of electronic or computing devices that are capable of determining and processing input and wireless signals can be used in accordance with various embodiments discussed herein. These devices can include, for example, notebook computers, tablet computers, desktop computers, personal data assistants, electronic book readers, video gaming consoles or controllers, televisions or smart televisions, and portable media players, among others. In this example, since the user is holding device 102 substantially away from their body, device 102 is experiencing first signal strength 104.

FIG. 1B shows user 100 holding computing device 102 in with one hand against their head and experiencing second signal strength 106, which is not as strong as first signal strength 104, since the head of user 100 is obstructing a portion of the signal and, thereby, decreasing antenna efficiency. Accordingly, FIG. 1C shows user 100 holding computing device 102 in with two hands against their head and, thereby, experiencing third signal strength 106, which is weaker than both first signal strength 104 and second signal strength 106. Further, the pressure against which user 100 holds computing device 102 against their head and also how they hold the device can effect changes in antenna impedance.

Based in part on constraints imposed on an antenna system resulting from the design of computing device 102 (i.e., squeezing components tightly around the antenna region), the effective radiation bandwidth of the antenna system can be potentially quite narrow, which makes the antenna system sensitive to the user circumstances discussed above. However, since each of these circumstances imposes different constraints on the antenna, the optimal configuration of the antenna system for each circumstance may be different.

In at least one embodiment, a signal strength signature or pattern of a computing device can be observed and documented under various circumstances. An optimal configuration of the antenna system can then be determined for each signature or pattern. The optimal configurations can then be correlated, tabled, or mapped to their corresponding pattern, so that when the computing device observes a drop or change in signal strength substantially matching a mapped pattern (to within an allowable deviation), the antenna system can be reconfigured or adjusted to provide the optimal configuration for the circumstance associated therewith.

In at least one embodiment, one or more sensors of the computing device can be used to anticipate that a change in signal strength is about to occur. For example, a user facing camera of the computing device may identify that the user has answered a phone call and is moving the device toward their ear. As a result, the computing device could reconfigure the antenna system to the optimal configuration for that particular circumstance. Accordingly, sensor information can be used as an input vector to a mapped antenna configuration for a predetermined user imposed condition. Such a technique may utilize at least one of an artificial intelligence algorithm that utilizes one or more of computer vision, machine learning, pattern classifications/recognition, or the like. Additionally, a gyroscope, accelerometer, proximity sensor, light sensor, and any other device sensor that can be used to determine or identify patterns associated with the computing device in various instances or circumstances can also be used.

Further, the computing device may observe, track, or monitor habits, mannerisms, and other movements of a particular user (using one or more of the device sensors) to learn to anticipate when a user is going to impose a particular circumstance on the computing device. Accordingly, upon learning a particular mannerism indicative of a change in signal strength, the computing can use detection of that mannerism as a trigger to reconfigure the antenna system to the optimal antenna configuration for the circumstance the mannerism suggests.

In at least one embodiment, as discussed elsewhere herein, the antenna system may include multiple antennas, such as one high band and one low band antenna on a top end of the device and another high and low band antenna on a bottom. Accordingly, reconfiguring the antenna system can at least include utilizing only a subset of the antennas and then adding one or more additional antennas to widen an effective bandwidth of the overall antenna system, and vice versa when it is desirable to narrow the effective bandwidth. For example, widening the effective bandwidth can make the antenna system less sensitive to changes in antenna impedance. Further, other parameters or components of the antenna system, such as reconfigurable capacitors or PIN diodes, can be used to change the resistivity of the antenna circuit to vary the width of the effective bandwidth.

Figure 2:
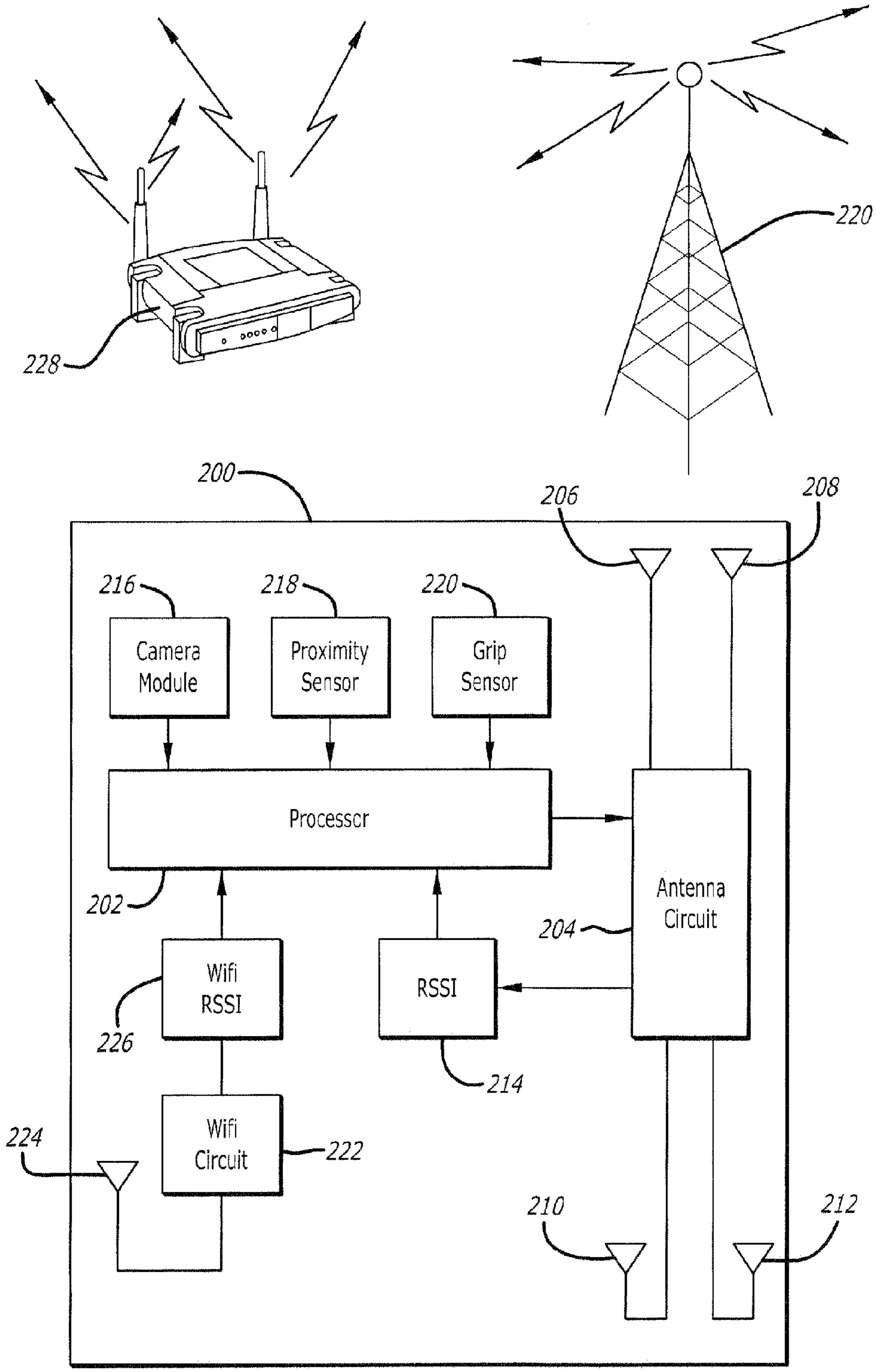
FIG. 2 shows a set of example components for adapting an antenna configuration based on a user's scenario in accordance with at least one embodiment.

FIG. 2 shows a set of example components of computing device 200 that can be used within the scope of various embodiments. In this example, antenna circuit 204 receives signals from each of four antennas (206, 208, 210, 212) which receives signals from base station 220. Antenna circuit 204 is in communication with received signal strength indicator (RSSI) 214 which measures power present in signals received by each of four antennas (206, 208, 210, 212). RSSI 214 provides data associated with the power measurements to processor 202 which can match the data associated with the power measurements to patterns associated with circumstances know to effect a change in signal strength and provide data for the appropriate configuration of antennas (206, 208, 210, 212) to antenna circuit 204 for attempting to increasing the receivable signal for the same.

In at least one embodiment, the patterns associated with circumstances know to effect a change in signal strength may also include data from WiFi RSSI 226 for WiFi signal strength received by WiFi antenna 224 from WiFi modem 228 though WiFi antenna circuit 222. Accordingly, processor 202 may incorporate data from WiFi RSSI 226, if there is an active WiFi connection available, to further validate a particular pattern.

Further, the processor 202 may receive data from camera module 216, proximity sensor 218, grip sensor 220, or any other sensor not shown in FIG. 2 as input when attempting to anticipate a change in signal strength as discussed elsewhere herein. It should be understood that computing device 200 could store data for signal strength patterns and associated optimal configurations, could store sensor data indicative of a change in signal strength and their associated optimal configurations, or both and use each method as a means of verifying conclusions of the other.

Figure 3:
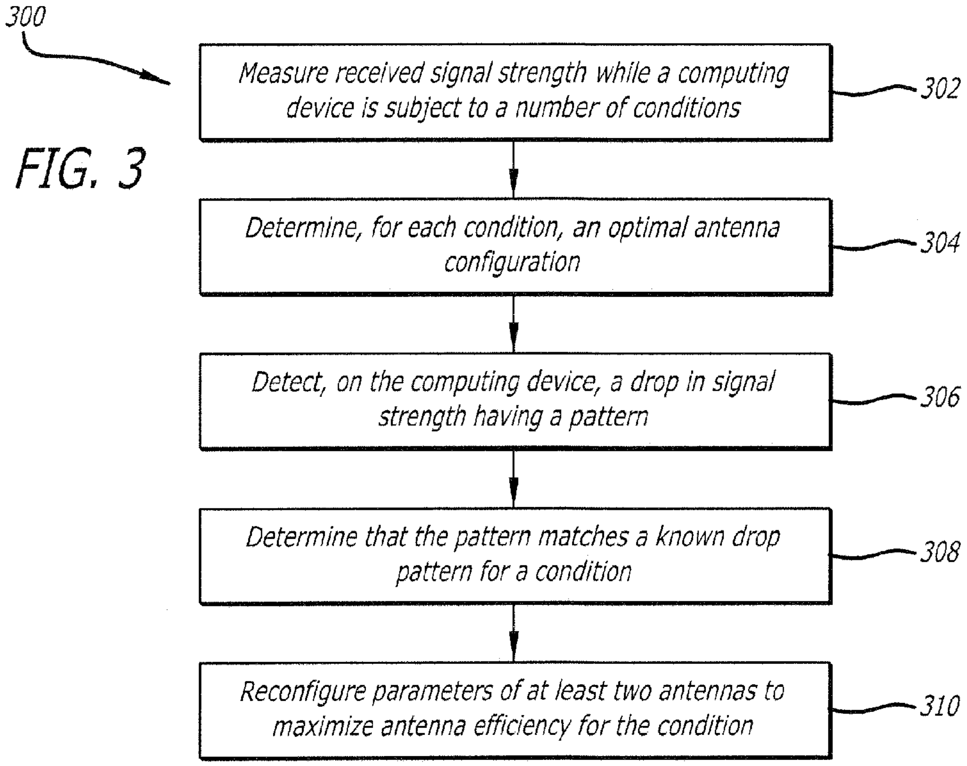
FIG. 3 shows an example process for adapting an antenna configuration based on a user's scenario that can be used in accordance with at least one embodiment.

FIG. 3 illustrates an example process 300 that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, received signal strength is measure 302 while multiple antennas of a computing device are subject to a number of predetermined conditions associated with changes in signal strength. In this example, the configuration the antennas that substantially maximizes antenna efficiency for each condition is determined 304. Upon detecting 306 a drop in received signal strength having an associated drop pattern, the drop pattern, in this example, is determined to match a drop pattern associated with the computing device being subject to a condition to within an allowable deviation 308. Accordingly, one or more antenna parameters are then reconfigured 310 to a configuration that substantially maximizes antenna efficiency for the condition.

Figure 4:
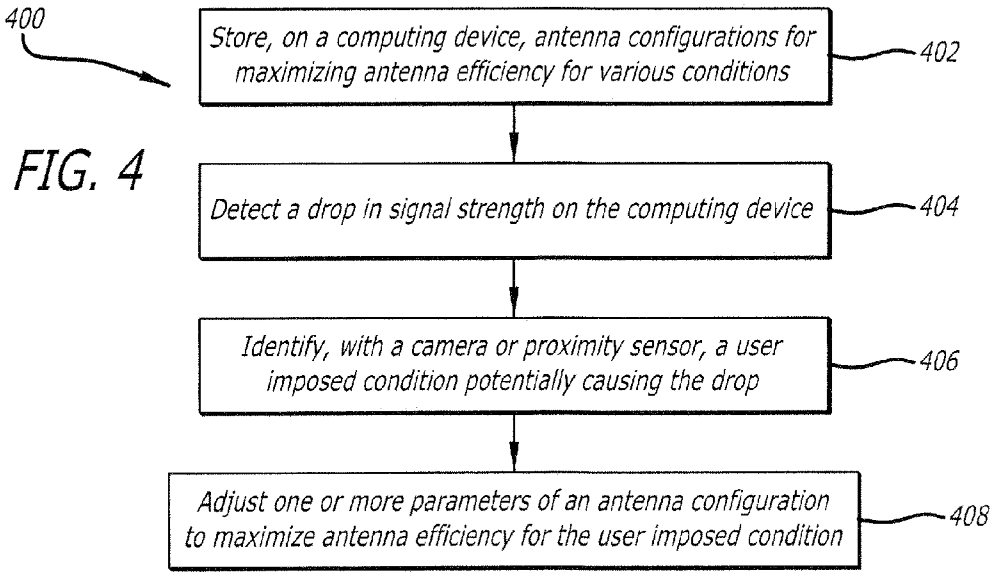
FIG. 4 shows another example process for adapting an antenna configuration based on a user's scenario that can be used in accordance with at least one embodiment.

FIG. 4 illustrates an example process 400 that can be used in accordance with various embodiments. In this example, antenna configuration that each maximize antenna efficiency for each of a number of user imposed conditions are stored on a computing device 402. In this example, a change in signal strength is detected 404. The change can be detected as a result of monitoring, using a received signal strength indicator (RSSI), signal strength of multiple antennas of the computing device, for example. Upon detecting the change in signal strength, a condition associated with the change is identified 406 using at least one of a camera or any other device sensor that can determine a user's context or circumstance, for example. Accordingly, upon identifying the condition, one or more parameters of the antennas are adjusted 408 to maximize signal strength for the computing device while being subject to the condition.

Further, in at least one embodiment, a transmitter can increase power output upon detecting the change in signal strength. Since it is critical to be connected to and in constant communication with a base station in order to be sent a signal to receive, total power being radiated from one or more transmitters of the computing device can be increased upon detecting a drop in signal strength. Similarly, upon receiving a strong signal, the power output could be decreased in order to conserve battery power of the computing device, for example. Accordingly, a variable transmitter power output can be utilized in conjunction with other parameters or components of the antenna system, such as the tunable antennas, reconfigurable capacitors, or PIN diodes, in order to maximize antenna efficiency and/or received signal strength, within the scope of various embodiments.

FIGS. 5A and 5B show front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

FIG. 6 shows a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a UPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
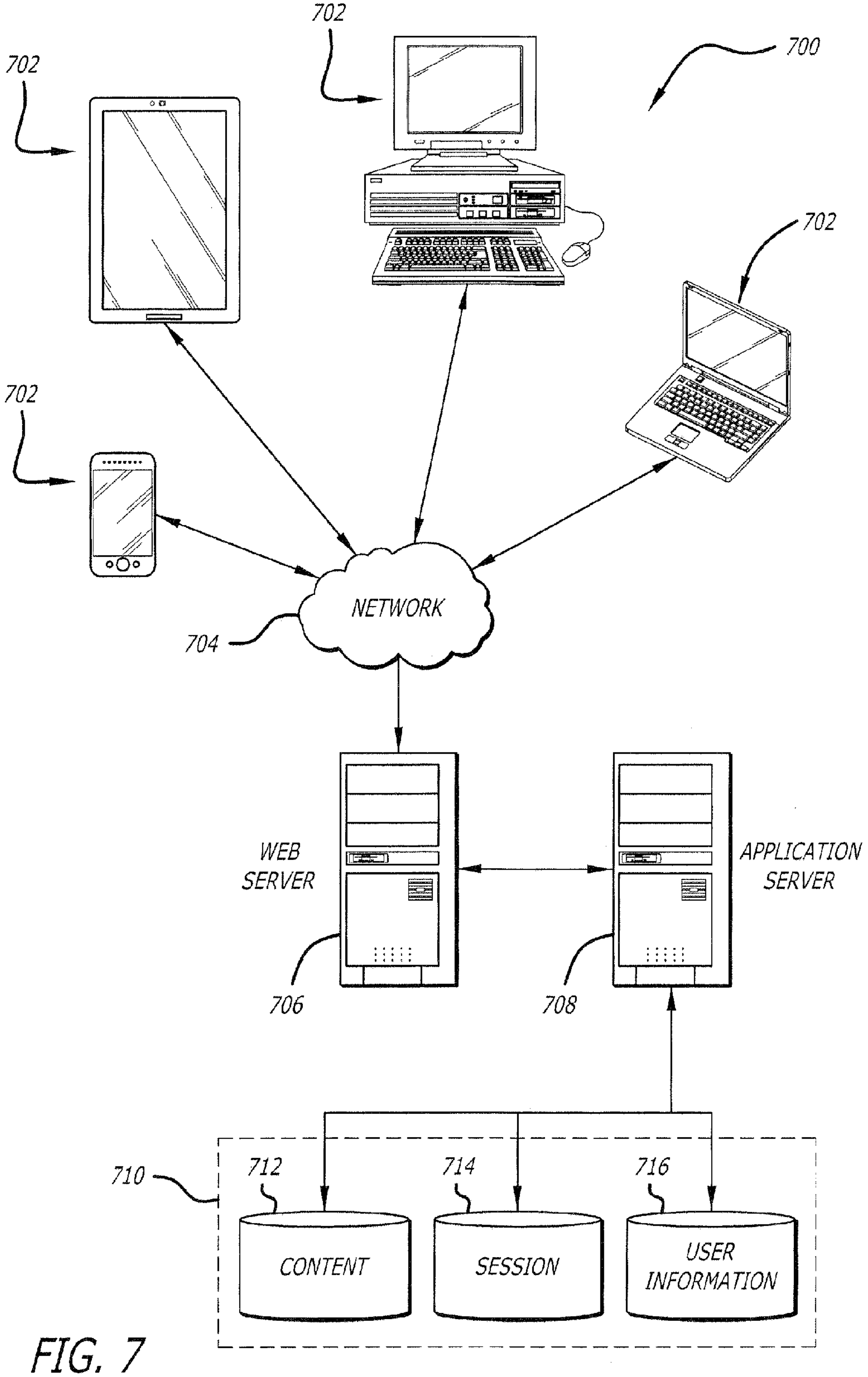
FIG. 7 shows an environment in which various embodiments can be implemented.

As discussed, different approaches can be implemented in various environments in accordance with the described embodiments. For example, FIG. 7 shows an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store shown includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are shown in FIG. 7. Thus, the depiction of the system 700 in FIG. 7 should be taken as being illustrative in nature and not limiting to the scope of the disclosure.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Peri, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:

receive, from at least one sensor of the computing device, data indicating that a change in received signal strength, having an associated change pattern, is about to occur;

detect, based at least in part on signal strength data associated with at least two antennas of the computing device, the change in received signal strength having the associated change pattern, the computing device storing data for a plurality of change patterns and data for a configuration of the at least two antennas that improves antenna efficiency within a respective frequency range for each of the plurality of change patterns, wherein a change pattern is associated with a user circumstance impacting the received signal strength;

determine, using the at least one processor, that the associated change pattern matches at least one of the plurality of change patterns to within an allowable deviation associated with the computing device being subject to a condition, wherein the at least one processor is configured to receive data from a component configured to determine a received signal strength indicator (RSSI) and the component is in communication with the at least two antennas; and generate one or more antenna parameters according to a configuration that improves antenna efficiency for the condition by at least one of widening a receivable bandwidth or adjusting a range of bandwidth of at least one of the at least two antennas.

2. The non-transitory computer-readable storage medium of claim 1, wherein the instructions that, when executed by the at least one processor, further cause the computing device to:

measure received signal strength while the at least two antennas are subject to each of at least one condition associated with the cause of each change; and determine, for each of the at least one condition, the configuration of the at least two antennas that substantially maximizes antenna efficiency for each condition.

3. The non-transitory computer-readable storage medium of claim 1, wherein the associated change pattern includes received signal strength data from a cellular RSSI and a Wi-Fi RSSI.

4. The non-transitory computer-readable storage medium of claim 1, wherein the one or more antenna parameters include at least one of the at least two antennas, one or more reconfigurable capacitors, or one or more PIN diodes.

5. The non-transitory computer-readable storage medium of claim 4, wherein the at least two antennas, the one or more reconfigurable capacitors, and the one or more PIN diodes are associated with an antenna circuit, the antenna circuit providing data to the component, and the component providing data to the at least one processor for reconfiguring the one or more antenna parameters for the associated change pattern.

6. A computer-implemented method, comprising:

under the control of one or more computer systems configured with executable instructions, receiving, from at least one sensor of the one or more computer systems, data indicating that a change in received signal strength associated with a condition is about to occur;

monitoring received signal strength indicator (RSSI) data based at least in part on signal strength data associated with at least two antennas of a computing device;

detecting the change in signal strength;

identifying, using a processor of the one or more computer systems, the condition associated with the change, wherein the processor is configured to receive the RSSI data from a component configured to determine the RSSI and the component is in communication with the at least two antennas; and generating one or more parameters associated with the at least two antennas to maximize signal strength for the computing device upon being subject to the condition.

7. The computer-implemented method of claim 6, wherein an associated receivable bandwidth of the at least two antennas is tuned to receive signals within a narrow bandwidth and the one or more parameters are adjusted to at least one of widen the receivable bandwidth or adjust a range covered by the receivable bandwidth.

8. The computer-implemented method of claim 6, wherein adjusting the one or more parameters includes activating an additional antenna to widen an effective receivable bandwidth.

9. The computer-implemented method of claim 6, further comprising:

measuring received signal strength while the at least two antennas are subject to each of a plurality of conditions; and determining, for each of the plurality of conditions, a configuration of the one or more parameters that maximizes antenna efficiency for each of the plurality of conditions.

10. The computer-implemented method of claim 6, wherein the condition is the computing device being pressed against a user and identifying the condition includes:

receiving data from the at least one sensor of the computing device to determine a distance between the user and the computing device.

11. The computer-implemented method of claim 10, wherein the at least one sensor is at least one of a camera, a proximity sensor, grip sensor, or a gyroscope.

12. The computer-implemented method of claim 6, wherein identifying that the change includes receiving signal strength data from at least one of a cellular RSSI and a Wi-Fi RSSI.

13. The computer-implemented method of claim 6, wherein the one or more parameters include at least one of the at least two tunable antennas, one or more reconfigurable capacitors, or one or more PIN diodes.

14. The computer-implemented method of claim 13, wherein the at least two tunable antennas, the one or more reconfigurable capacitors, and the one or more PIN diodes are associated with an antenna circuit, the antenna circuit provides data to the component, and the component provides data to the at least one processor for adjusting the one or more parameters.

15. A computing device, comprising:

a processor; and memory including instructions that, when executed by the processor, cause the computing device to:

receive, from at least one sensor of the computing device, data indicating that a change in received signal strength associated with a condition is about to occur;

detect, based at least in part on signal strength data associated with at least two tunable antennas of the computing device, the change in received signal strength, the computing device storing data associated with optimal configurations of the at least two antennas for maximizing antenna efficiency for a plurality of conditions;

identify, using the processor, the change being associated with a condition of the plurality of conditions, wherein the processor is configured to receive data from a component configured to determine a received signal strength indicator (RSSI) and the component is in communication with the at least two antennas; and generate one or more parameters associated with the at least two antennas to an antenna configuration that maximizes the antenna efficiency for the condition.

16. The computing device of claim 15, wherein an associated receivable bandwidth of the at least two antennas is tuned to receive signals within a narrow bandwidth and the one or more parameters are adjusted to at least one of widen the bandwidth or adjust a range covered by the narrow bandwidth.

17. The computing device of claim 15, wherein the condition is associated with the computing device being pressed against a head of a user and identifying the change being associated with the condition includes:

receiving data from the at least one sensor of the computing device to determine a distance between the user and the computing device.

18. The computing device of claim 17, wherein the at least one sensor is at least one of a camera or a proximity sensor.

19. The computing device of claim 15, wherein adjusting the one or more parameters includes adjusting power of a transmitter associated with the at least two antennas.

20. The computing device of claim 15, wherein the one or more parameters include at least the at least two tunable antennas, one or more reconfigurable capacitors, and one or more PIN diodes and are associated with an antenna circuit, the antenna circuit provides data to the component, and the component provides data to the processor for adjusting the one or more parameters.

21. The non-transitory computer-readable storage medium of claim 1, wherein the component is included as part of the processor of the one or more computer systems.

22. The computer-implemented method of claim 6, wherein the component is included as part of the processor of the one or more computer systems.

23. The computing device of claim 15, wherein the component is included as part of the processor.

* * * * *